United States Patent [19]

Chatwin et al.

[11] Patent Number: 5,492,370
[45] Date of Patent: Feb. 20, 1996

[54] DECORATIVE ARTICLE

[75] Inventors: Charles E. Chatwin, Horsham; Ralph Kay, Maidenhead, both of United Kingdom

[73] Assignee: De La Rue Holographics Ltd., London, United Kingdom

[21] Appl. No.: 98,267

[22] PCT Filed: Mar. 20, 1992

[86] PCT No.: PCT/GB92/00514

§ 371 Date: Aug. 31, 1993

§ 102(e) Date: Aug. 31, 1993

[87] PCT Pub. No.: WO92/16378

PCT Pub. Date: Oct. 1, 1992

[30] Foreign Application Priority Data

Mar. 22, 1991 [GB] United Kingdom ............... 9106128

[51] Int. Cl.$^6$ .................................................. B32B 3/00
[52] U.S. Cl. ........................... 283/110; 283/82; 283/83; 283/107; 283/108; 283/904; 283/94; 359/2; 359/3; 428/916
[58] Field of Search ................................ 428/915, 916; 359/2; 283/85, 86, 91, 904, 82, 83, 107, 108

[56] References Cited

U.S. PATENT DOCUMENTS

| | | | |
|---|---|---|---|
| 3,894,756 | 7/1975 | Ward | 283/7 |
| 4,171,864 | 10/1979 | Jung et al. | 350/3.61 |
| 4,631,222 | 12/1986 | Sander | 428/172 |
| 4,856,857 | 8/1989 | Takeuchi et al. | 283/904 |
| 5,015,318 | 5/1991 | Smits et al. | 428/915 |
| 5,053,260 | 10/1991 | Brehm | 428/915 |
| 5,101,184 | 3/1992 | Antes | 283/91 |
| 5,104,471 | 4/1992 | Antes et al. | 428/915 |
| 5,215,809 | 6/1993 | Hoso et al. | 428/915 |
| 5,298,310 | 3/1994 | Havens | 428/915 |
| 5,319,475 | 6/1994 | Kay et al. | 428/915 |

FOREIGN PATENT DOCUMENTS

| | | |
|---|---|---|
| 488652 | 9/1973 | Australia . |
| 0004559 | 10/1979 | European Pat. Off. . |
| 0201323 | 5/1986 | European Pat. Off. . |
| 0227423 | 12/1986 | European Pat. Off. . |
| 3942663A1 | 12/1989 | Germany . |
| 2125337 | 8/1982 | United Kingdom . |
| 2092952 | 8/1982 | United Kingdom . |
| 2129739 | 2/1983 | United Kingdom . |
| 2119312 | 4/1983 | United Kingdom . |
| WO90/01733 | 2/1990 | WIPO . |
| WO91/03747 | 3/1991 | WIPO . |
| WO91/06925 | 5/1991 | WIPO . |

Primary Examiner—Patrick J. Ryan
Assistant Examiner—Kam F. Lee
Attorney, Agent, or Firm—Oliff & Berridge

[57] ABSTRACT

The article includes a substrate which is composed of a single ply that contains both a structure for generating a viewable optically variable effect, such as a hologram, and carries an indicia receptive coating. The indicia receptive coating covers the single ply such that at least part of the optically variable effect is visible. The indicia receptive coating may receive printed indicia such as security indicia, alphanumeric character shapes, symbols, and bar codes. The article with the single ply that contains viewable optically variable effect and also carries the printed indicia, is more tamper resistant than previous identification documents. It is very difficult, if not impossible, to alter the printed indicia without also altering the structure that generates the viewable optically variable effect or vice versa.

29 Claims, 5 Drawing Sheets

DECORATIVE ARTICLE

BACKGROUND OF THE INVENTION

Holograms and diffraction patterns have gained acceptance in recent years as anti-counterfeiting and anti-tamper devices. Such devices are typically made by embossing a plastics film with an optically diffracting pattern and providing a metallic surface which follows the finely embossed structure such that on viewing the optical effect can be seen.

Often the holographic image is made to reconstruct in white light. The reflective metallic structure is generally viewed through the transparent plastic. Alternatively it is possible to obtain an holographic effect which may be brighter by viewing directly the reflective metal coating on the embossed plastic, provided that the metallic coating maintains the diffracting surface's profile.

It is possible for the polymeric surface of these mass produced replicas to be made by embossing from a nickel or hard plastic master directly into a thermo-plastic film, or by causing reactive entities to polymerise or crosslink under the influence of radiation such as electron beam radiation or ultraviolet radiation while in contact with the master. In both cases the surface accurately takes the shape of the metallic or other mould which holds the fine line structure. Unmetallised polymeric surfaces are then typically metallised with a thin coating of, for example, aluminium.

EP-A-0201323 describes a transparent hologram having an embossed layer of transparent plastic, coated with a thin transparent layer which has a different refractive index to enhance the quality of the hologram. The hologram so formed may be positioned on a substrate carrying printed information which will still be visible through the hologram.

Holograms have seen increasing use for anticounterfeiting, antiforgery, antitamper and authentication purposes over recent years and that success continues to be enjoyed. Authenticatable items such as credit cards will generally have discrete hologram labels stamped on under heat and pressure from a carrier film but this is a time consuming process. The size of the areas which can be applied is also limited. Additionally hot stamping is only suitable for smooth substrates as coarse substrates may cause texturing of the hologram. This may present both undesirable aesthetic qualities and difficulties in machine reading of encoded holograms. Overprinting such labels is often difficult.

The above cards generally employ discrete holographic images such as of a bird. These images must be placed in register within the label and the label must be in register with the printing on the remainder of the article. It is however possible in some applications where image-to-label registration is not necessary to provide a substantially continuous pattern of repeating holographic images of small size. The print registered stamping of this type of pattern does not require precise image-to- label registration as whatever area is stamped will hold a number of the small images. (This is sometimes called a "wallpaper" or "generic" design.)

SUMMARY OF THE INVENTION

GB-A-2125337 describes security printing of articles which bear holographic devices. These optically variable devices are however affixed to substrates and as such can be detached, albeit with difficulty. To prevent this the holograms are covered and printed with protective layers.

The Government of Australia issued a commemorative bank note which consisted of a plastic substrate onto which a holographic label was affixed. While the article combined security printing beside an hologram the hologram was affixed to the security printing substrate and thus liable to detachment.

International Patent Publication No. WO91/06925 describes security printed holograms in which images, including printed images, are placed inside the holographic device, such as on the embossed plastic prior to metallisation. This patent application allows the possibility of there being printing over an area of the hologram and partial concealment of the metallic layer for example to produce serially numbered holographic labels.

The stamping of holographic and diffractive hot blocking foils onto security documents to form holographic labels, for example, is described GB-A-2129739. Such labels are securely bonded but nevertheless are affixed by a discrete layer adhesive. Hot embossing foils are also described in U.S. Pat. No. 4,631,222.

GB-A-2119312 describes how a plain, non-holographic metallic foil is continuously rolled against and thus transferred to a paper substrate for example to give a continuously looping pattern which continues from one document to the next on the roll. This patent envisaged the overprinting of at least part of the plain metallic foil.

There is a need to provide security articles in which optically variable effect devices such as holograms are less liable to detachment than hitherto.

There is a need to provide more convenient manufacturing methods which would allow holographic replicas to be used more extensively.

In accordance with one aspect of the present invention, an article comprises a substrate which includes a structure for generating a viewable optically variable effect, the substrate being partially provided with an indicia receptive coating such that at least part of the optically variable effect remains visible.

Thus instead of adhering a label carrying an optically variable effect to an article, the optically variable effect generating structure forms an integral part of the article. This not only allows additional security but manufacturing benefits. The invention provides the combination of high level counterfeit-resistance, sophisticated security printing features and a high degree of tamper resistance, all within a readily manufacturable aesthetic article.

References in the description to the term optically variable effect shall include visible light diffraction, visible light interference and polarisation effects.

Diffraction offers the greatest complexity as it is possible to offer a spectrum of diffraction effects ranging from regular diffraction grating structures through diffraction grating mosaics and graphical diffraction effects (such as 2D and 2D/3D effects), to the simple or complex holographic reconstruction of objects, effects such as are seen in, holograms, stereo holograms and multiplex holograms. Such diffractive structures can be created from fine line engraving, laser holography and electron beam recording methods. Computer generated diffractive patterns can be created, for example the Landis and Gyr Kinegram and the diffraction catastrophe patterns of Reserve Bank of Australia (WO/90/01733). Pixellated diffractive structures may be created by using the system described by CSIRO in WO91/03747. The diffraction effects of the present invention result from the presentation of a viewable surface which possesses a diffracting profile.

The polarisation of white light may be effected through the use of liquid crystal materials as described in AU-488652 or by using polymeric liquid crystalline material such as described in DE-A-3942663. Such materials will have relatively high molecular weights and may be applied by coating or screen printing methods.

White light interfering patterns result from the manufacture of multiple layers of materials having different refractive indices, which are deposited at thicknesses approximately one quarter of the wavelength of light. Such materials may be used directly coated on the film, or adhesively transferred to another substrate. Additionally there are known to be inks which comprise flakes of such layered structures such as described in EP-A-227423.

The optically variable effects will normally be viewable in white light e.g. so-called "rainbow" holograms, although machine readable diffractive effects may be used.

The invention is however not restricted to the use of optically variable effect images which are viewable in white light, optically variable effects which occur in monochromatic light whether in the visible or infrared may also be employed.

The optically variable effects may be used for visible authentication to the naked or assisted eye, or for machine authentication in which light sensing means are employed. Such machine readability is useful for automatic scanning processes.

Typically, the substrate comprises a polymeric film and the film supporting the optically variable effect will extend through the full area of the article i.e. the film is planar.

An area of the article may carry no optically variable effect beneath the indicia receptive coating or it may have an underlying optically variable effect area which has been at least partially obscured, e.g. by the indicia receptive coating printed over it.

In accordance with a second aspect of the present invention, we provide an article comprising a substrate which includes a structure for generating a viewable optically variable effect, the substrate being partially provided with a continuous coating, wherein the coating acts as a mask which overlies at least part of the structure for generating a viewable optically variable effect and includes one or more windows through which the optically variable effect can be observed.

The coating may be adapted to receive indicia and/or the surface of the substrate not carrying the coating may carry indicia.

Preferably the area in which an optically variable effect is visible exhibits an individual, diffractively generated image or a diffractive image comprising a repetitive pattern. If the image is individual then the coating will need to be in register.

Preferably the coating covers a substantial area of the article.

In one example, on viewing the article from its principal side the viewer will see one or more areas of optically variable effect (which if diffracting may be selected independently from individual image or generic image patterns), an area of an indicia receptive coating which may bear printing, and optionally a third area which may be selected from an optically variable effect image, reflective metal, transparent plastic or a combination.

Preferably the printing and/or windows define identification marks or security indicia, for example miniature text. Security indicia, alphanumeric character shapes and symbols may thus be formed by omitting such shaped areas in the surrounding coating, allowing the underlying optically variable effect to show through and thereby giving the vitual impression of, say, holographically printed number shapes. Shapes such as bar codes may be employed as an alternative.

In another example a metallic coating is provided on the substrate, the metallic coating being selectively removed to define security indicia, the optically variable effect being viewable in the areas in which the coating has been removed.

Diffracting optically variable effect structures will typically be formed by embossing undertaken with a hot metallic shim which is used to replicate a diffracting pattern directly into the plastics, after which metallisation occurs. It is however possible to emboss the metallised surface of the substrate after metallisation. Commonly the whole surface of the substrate will be embossed with a generic diffracting pattern except in an adjacent area designated for a single diffraction image. The generic pattern may then be completely obscured on the viewing side by the indicia receptive coating. The substrate may be a plastic film which has been corona treated so as to control bonding of the metallic layer for example to import antitamper properties.

The invention is also applicable to embossed articles having other types of fine markings in which the embossing does not create a light diffracting effect, such as matt diffusing effects, engraved line patterns and the like.

The precise optical effect created by diffractive embossing will not affect the principle of this invention significantly. Combinations with light scattering matt effects or coarser non-diffractive embossing patterns may also occur. In certain instances the completed article roll stock may be printed by intaglio if necessary under ink-free conditions, to give a fine security embossed relief pattern.

In order to provide an article having a viewable enclosed diffracting image, the diffracting image may be formed in a lacquer coated area of the substrate. The substrate will be completely metallised on the embossed side. The metallic surface will then be coated, leaving an area through which the diffracting structure may be seen, with an opacifying ink, the (indicia receptive) coating, preferably applied as a thick ink by screen printing on a rotary screen printing machine. Other opacifying printing processes such as letterpress, offset lithography, gravure and flexography may be employed, as may be electronically controlled imaging means. This indicia receptive coating may include character shaped "windows". The (indicia receptive coating) may be applied in rainbow blending fashion.

In the above example the indicia receptive coating was applied to the metallic surface. The coating could however be applied to the opposite side of the transparent substrate to obtain the same overall appearance. Additionally the coating could be applied internally, prior to embossing and metallising.

As well as security indicia the printing applied to the indicia receptive coating may include other information, such as issuing authority information and individualising marks (whether for groups or individuals). The final article may then be cut to size and may be used as a security item in its own right, such as a vehicle tax disc in this case after lamination with a transfer adhesive.

Such security printed articles have very much enhanced security as the optically variable effect is integral with the substrate and cannot be peeled away, like a label.

Additionally, by employing overprinting methods for applying the coating leaving appropriately shaped windows it is possible to "print" much finer holographic and similar effects than would be possible using labelling methods. It is also easier to effect changes and to cover much larger areas than hot stamping would allow.

The completed article may be affixed to another item e.g. as a visa in a passport, after personalising in a laser electrostatic printer.

Clearly, depending on the application, coatings e.g. printing inks may be applied in a variety of positions and the coating need not always be on the same side, a combination may be used. The same overall effect to the viewer will however be given.

Diffractive embossing of the plastics or metallised plastics may be confined to individual areas, these areas corresponding to where the optically variable effect on the finished article could be. Alternatively the embossing may be overall, given that only the viewable portion is to be seen. This is particularly applicable to generic patterns. In practice this overall embossing method will be employed in many instances.

If the reverse of the article is to be viewed, such as in vehicle tax disc applications where the article is affixed to a windscreen the provision of an overall embossing may provide a pleasant viewing surface to the back of the disc as well as providing security.

The surface of the substrate opposite to the surface carrying the coating may also be coated with inks in the above manner to provide a double sided article. The front and back coatings may be in register. This is especially important if a transparent holographic film is being employed. If necessary the article may be coated with protective lacquers or laminated onto other layers.

The article may include an adhesive or laminatable layer to enable the article to be adhered to a further substrate.

In accordance with a third aspect of the present invention, a method of manufacturing articles comprises providing a substrate including a structure for generating an optically variable effect; and providing a partial continuous indicia receptive coating on the substrate such that at least part of the optically variable effect remains visible.

This allows a new manufacturing method in which the substrate is first provided with an optically variable effect generating structure and then the substrate is placed on a printing press, and an indicia receptive coating is printed on to the surface of the substrate but leaving areas through which the optically variable effect is exhibited.

In accordance with a fourth aspect of the present invention, we provide a method of manufacturing security articles, the method comprising providing a substrate including a structure for generating an optically variable effect; and providing a partial continuous coating, wherein the coating acts as a mask which overlies at least part of the structure for generating a viewable optically variable effect and includes one or more windows through which the optically variable effect can be observed.

Preferably, the coating can receive indicia. In this case, the method may further comprise providing indicia on the indicia receptive coating.

Typically the method further comprises defining a number of articles on the substrate each incorporating a first, viewable optically variable effect area and a separate, second indicia providing viewable area, wherein the separate area of the substrate exhibits printing; and dividing the substrate into individual articles.

Typically the substrate is or comprises a polymeric film.

Preferably the coating is opaque.

The substrate may be in the form of a sheet for printing, but preferably is in the form of a roll. For example, after a printing step in which an indicia receptive coating is applied and security indicia are printed onto the substrate, the bulk roll or sheets will be converted into reels, strips, large sheets or individual items.

A step and repeat stamping method such as might conventionally be used to attach a device having an optically variable effect, e.g. a hologram to a document limits the speed of the manufacturing process. The present invention avoids the need for this slow process by incorporating the optically variable effect generating layer as part of the internal structure of the article. The article may be used on its own or be attached to another surface.

As explained below the order of embossing, metallising and printing steps may be varied.

The substrate may comprise a diffractively embossed polymeric film, for example a film forming plastic such as polypropylene, polyvinyl chloride, cellulose acetate, and polyester (including biaxially orientated polyester films). The polymeric film may alternatively be supplied supported on another plastic film, or it may be supported (e.g. coated) on paper, or transferred to a substrate, such as a plastic film substrate or fibrous material such as cellulose or rag paper, or woven or non-woven plastic fibres composites papers, or spun bonded papers.

In one example a roll of the substrate e.g. a thermoplastic (polymeric) film is embossed on one surface, that surface is metallised, and then a coating is applied to the metallised surface and/or to the opposite surface to define on one side of the article an optically variable effect and coating. In many cases, the coating will be indicia receptive and of a background opacifying nature which can then be used as a base for security marks, individualising information and the like. Generally the indicia receptive coating is in a single colour or defines a rainbow effect. The coating may incorporate miniature repeating image voids such a logos or name i.e. micro-writing formed in the negative. The roll is then cut into article size pieces or it may be slit or if necessary supplied in that format for further processing. Generally the indicia printing step is performed before the dividing step.

In a second example, the metallising and embossing of the first example are reversed.

In a third example, a roll of polymeric film having a high glass temperature is coated with a lacquer of much lower glass transition temperature and the coating then diffractively embossed at a temperature close to the lower glass transition temperature. This is then metallised. Indicia receptive printing is applied to one or both surfaces so that viewed from one side there is an optically variable effect and a background coating. This coating is then printed with indicia. Thereafter the roll is cut as before.

In a fourth example, the embossing and metallising of the third example are done in reverse order.

Alternatively after embossing and metallising, the roll stock may be cut into sheets containing multiples of the article so that coating can occur on a sheet fed printer. The coating of roll stock is however more likely to be used.

Generally it is desirable to provide a protective layer over the metal of the metallised embossing substrate and this may be done by applying a lacquer or laminating a film in place.

The coated roll stock may be supplied with an adhesive, directly by coating or by laminating against a pressure sensitive transfer adhesive supplied on a release layer (plastic or paper). The articles may then be cut to size.

The diffracting optically variable effect area may preferably be opaquely reflectively metallised either completely or less commonly partially. If the area is partially metallised this can be by a thinner transparent coating of metal, but alternatively, the metallisation is in the form of a halftone dot pattern. The metallised area may simply be confined to the viewable optically variable effect area but it may cover all or part of the non-viewable areas. Other areas may be metallised and viewed simply as metallic areas. For manufacturing ease the metallic coating will be applied over the entire surface of the article as it will be easier to run the whole roll through the metalliser.

The method of manufacturing security articles may further comprise applying a corona treatment to an embossed plastic surface of the substrate which will carry the metallisation so as to control the delamination properties at diffractive interface. This is especially useful for increasing the level of otherwise poorly bonding substrates such as polyolefins. The bonding of any inks applied at this interface may also be controlled by this means.

In the case of optically variable effect embossing this may be on the upper side of the substrate or the lower (in terms of viewing). If on the lower side then the substrate (or film) must be transparent. The term transparent is to be taken to include non-scattering polymeric films which may be colourless or coloured, such as tinted with dye.

In diffractive structures, the metallic coating may be selectively removed for example to form security indicia. This could be done by printing the metallic surface with a resist coating such as an ink or lacquer, covering the optically variable effect but leaving imagewise areas uncovered. The metal may then be removed by treatment, for example for aluminium with alkali. Alternatively metallisation may be undertaken on top of a water soluble printing ink.

Alternatively the surface of the polymeric film to be metallised may be coated and printed before metallisation or even before embossing with security indicia, in a manner that achieves register between the optically variable effect and the print. After metallisation there is seen a optically variable effect set within a reflective metallic area, the security indicia or text being securely presented against a metallic background.

After metallisation a coating of an opaque ink will commonly be applied over the entirety of the article if necessary covering generic diffractive image effects which have been embossed but are not to be viewed from that side of the substrate.

Any of the indicia receptive coating printing may be with opaque inks or, translucent inks, if necessary presented in rainbow blended fashion.

Optically variable effect structures arising from interference or polarisation will generally themselves not be transparent but depending on the nature of the substrate into which they are integrated, may be viewable from the reverse side and not only the primary viewing side (which presents the security indicia).

Diffractive optically variable structures may be opaque (allowing viewing from the primary viewing side and if exposed from the secondary viewing side but without allowing light to pass through the structure) or transparent (allowing viewing through the article from one side to another or allowing the revealing of the surface underneath the diffractive structure).

Opacity is normally achieved by placing a relatively thick layer of specularly reflecting metal such as aluminium on the diffractive surface. Transparency may be achieved by using a very thin, partially optically transparent, even coating of specularly reflecting metal such as aluminium. Alternatively it may be achieved by providing an opaque coating of metal such as aluminium in which halftone dot like areas are removed so as to provide the illusion of partial transparency. Alternatively the embossed surface may be provided with a thin layer of an inorganic material of relatively high refractive index such as zinc sulphide or titanium dioxide.

In addition to conventional ink, indicia printing inks which have dual properties such as magnetic inks, optically variable photochromic inks or invisible fluorescent inks may be employed. Alternatively indicia markings may be applied by suitable imaging means such as xerographic printing, ink jet printing, thermal transfer printing, impact printing and so on.

This imaging may be done while the articles are still on the roll or on the finished article.

In the case of an indicia receptive coating, this will normally have a continuous area sufficiently large (for at least 2 $cm^2$) to carry indicia which are readily visible to the unaided eye such as individual alphanumeric characters, signs, symbols or shapes and combinations of these. Alternatively the indicia may be provided on the indicia receptive coating and these may also extend over the optically variable material. The indicia may also be presented on the nearer viewable surface of the article with the indicia receptive coating being presented on an inner surface such that on viewing the indicia appear to be printed on the background of the indicia receptive coating.

On the article the optically variable effect will be presented against a boundary line of the indicia receptive coating or through shaped windows. For example the optically variable effect may be shaped in outline such as in alphanumerical character form, geometrical figure form, fine linework form, symbol form, logo form or patterned form, the outline being formed by the coating which may extend to the margins of the article.

The indicia receptive coating may for example define an end zone of the document which is to exhibit the optically variable effect or perhaps a longitudinal band by being printed in two parts.

In many instances the area of the article covered by the (indicia receptive) coating will be greater than that of the revealed area of the optically variable effect and may be at least twice or thrice or four times or more greater. In some articles the area may be at least ten times as great.

Translucent background inks or lacquers may be employed for the coating. The coating may be given a film-like smooth surface or the surface may be given a degree of roughness or porosity. Such roughness or porosity is desirable if the final article is to be printed with electrophotographic toner as it provides a key for the toner particles. Some roughness is also useful if the item has to be signed to allow a key for the ink.

After embossing, metallising and coating, the material may be passed through an intaglio press to impart engraving effects to the non-optically variable effect areas of the completed article, such as coated areas or plain metallic areas. The intaglio impression may simply emboss or it may, given suitable absorbency of the coating deliver ink markings. The viewable optically variable effect area will generally remain unembossed.

Areas not diffractively embossed may be otherwise pressure embossed with a conventionally engraved pattern such that the surface of the completed article will be deformed in accordance with the pattern.

Intaglio printing or other coarse embossing will impart a useful degree of tactility to the finished article, which is a further security enhancement for some applications.

For some applications the metallic side of the film may be given an adhesive coating during manufacture, such as a heat activatable adhesive coating or a pressure sensitive adhesive coating. In the case of the latter the adhesive will be protected by a release paper. W091/08524 relates to transferable holographic films in which the transferable coating is releasable from the carrier without any need for a wax or similar release layer. GB-A-2226980 describes passport overlaminate which is fixed by a pressure sensitive adhesive.

If the fairly new technology of curing monomers or prepolymers against masters in the presence of ultraviolet light is used then this will happen as follows. A roll of substrate e.g. polymeric film will be coated with a monomer and cured in order to replicate the embossing master's profile. The cured film will be metallised on the embossing and then receptively coated on either side.

As tamperproof security articles they may be employed as a part of a multiple page document such as one page of a document. The articles may alternatively be adhesively incorporated into other items such as visas into passports.

The bearer's or other individualising particulars may be added to indicia receptive areas of the article by manual means, by transfer ribbons such as in typewriters, by electronically controlled imaging means such as ink droplet printing, pin impact printing, thermal element printing (including material transfer printing methods and dye diffusion or dye sublimation printing methods), xerography, laser printing with toner, laser induced dye transfer, laser engraving and the like.

The articles may be used in their own right as individual security articles such as passports, visas, vehicle licence certificates, vehicle tax certificates, identity cards, financial transaction cards, access cards, cheques, bonds, tickets, passes, brand protection items, authentication certificates, vouchers, bank notes, bank note threads, credit notes, financial instruments, legal documents stamps, permits, licences such as driving licences, vehicle tax discs, tickets including lottery tickets and gaming cards, machine readable holographic articles, seals such as brand authentication labels and seals, tamper indicating seals and the like. The items may also be used for promotional purposes or decoration.

It is often desirable to achieve tamper resistance in such articles so that if an attempt at delamination is made this will result in destruction of the article for example by causing the optically variable effect to fail.

Tamper resistant delamination properties between the metallic layer and the optically variable effect embossing may be controlled by the treatment of the embossed surface prior to metallisation. For example if the polymeric layer diffractively embossed is polypropylene of thickness 30 to 80 microns, typically 50 microns, a corona treatment at 36 to 38 dynes per centimetre proves effective for a useful level of tamper resistant delamination of aluminium. By altering the energy control other levels of release properties can be readily obtained.

Tamper resistance may be enhanced by providing printing ink areas between the embossed surface and the metal. Preferably, the ink should bond well to the embossed surface and to the aluminium so that tearing at the embossed interface occurs.

When adhesives are to be used it is important to balance the strength of the adhesive against the delamination properties. The adhesive must be strong so that if an attempt at peeling is made the optically variable effect interface irreversibly fails.

BRIEF DESCRIPTION OF THE DRAWINGS

Some examples of security articles according to the invention will now be described with reference to the accompanying drawings, in which.

DETAILED DESCRIPTION OF PREFERRED EMBODIMENTS

Figure 1:
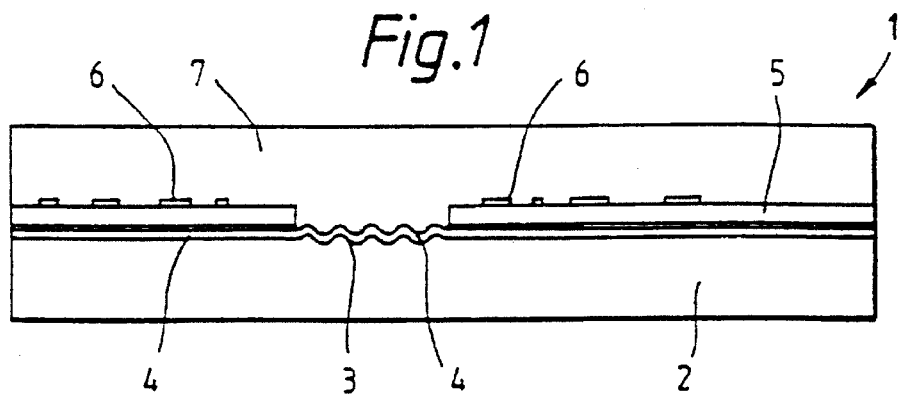
FIG. 1 is a cross-section of a first example.

The examples will be described mainly with reference to holograms, but this does not exclude the other types of optically variable effect described above. FIG. 1 illustrates a security article 1 comprising a layer of transparent polymeric material 2 which has been locally holographically embossed with a nickel master to impart a surface texture to the polymeric layer's surface at 3. A thin metallic coating of aluminium 4, generally 15–30 nm thick and thus opaque, is then applied over the complete surface which holds the local embossing. The full surface, both with and without embossing, is metallised. The embossed metallised areas produce a holographic effect. The metallic coating is then provided with an indicia receptive coating 5 which covers the non-embossed areas of the article. Onto this coating is applied security indicia 6. The surface may then be provided with a protective transparent lacquer such as an ultraviolet curable lacquer or a film 7.

The article may be viewed from the top and security printing will be seen to be set against a non-metallic background with a coplanar area reserved for the optically variable effect. If the metallic coating is sufficiently thin that it retains the diffractive effect, the embossed surface may be viewed through it. Viewing from the other side when the polymeric layer is transparent the surface will appear reflective metallic apart from an holographic area. This article may serve as a pass. Had an all-over generic pattern been applied the rear of the article would have exhibited an attractive, high security overall holographic effect.

In addition to using a thin but nevertheless opaque reflective coating of metal a thin metallic coating may be used of thickness less than 20nm. This is described in EP-A-201323 incorporated herein by reference. The diffractive structure will then become transparent. Alternatively a thin film of dielectric material having a refractive index of about 2 or above such as zinc sulphide ZnS, or titanium dioxide or zirconium oxide may be deposited. Common materials may be employed including polymeric coatings of substantially different refractive index to the embossed polymeric layer. Examples of dielectrics and polymeric coatings are given in EP-A-201323. Such metallic and other refracting coatings may also be employed if the diffracting pattern is replicated by polymerisation into curable polymeric materials.

Transparency may be imparted to holograms by imparting a fine halftone pattern to the metallic coating which is not resolved by the unaided eye. This is described in EP-A-328086.

Figure 2:
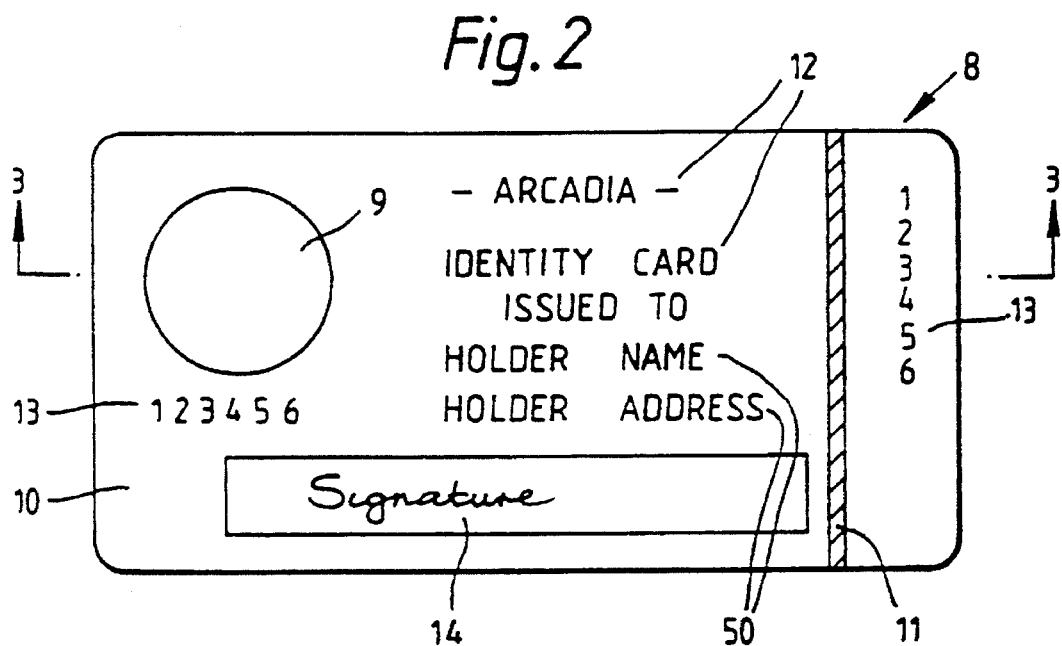
FIG. 2 is a plan view of an identification article.

In FIG. 2 there is provided an identification article 8 comprising a viewable holographic area 9 and a non-holographic area 10 defined by an indicia receptive coating which covers the entirety of the article except for area 9 and an unprinted strip 11. The article has a generic optically variable effect pattern generating structure which was embossed on all of the surface of the polymeric layer surrounding the individual holographic image viewed in area 9, but which is only visible through the unprinted strip 11. The embossed surface has been opaquely metallised to provide the holographic image. The article contains further printing 12 which identifies the card issuer and its type, and the name and address of the holder 50 and the card's serial number (in duplicate) 13 applied by laser xerography prior to issue to the holder.

As an alternative the embossing may cover all of the surface of the polymeric layer, which is also entirely metallised and be visible also through the area 9.

The article also has an area 14 of coating reserved for the holder to sign in ink; this serves as an ink receptive signature panel.

Figure 3:
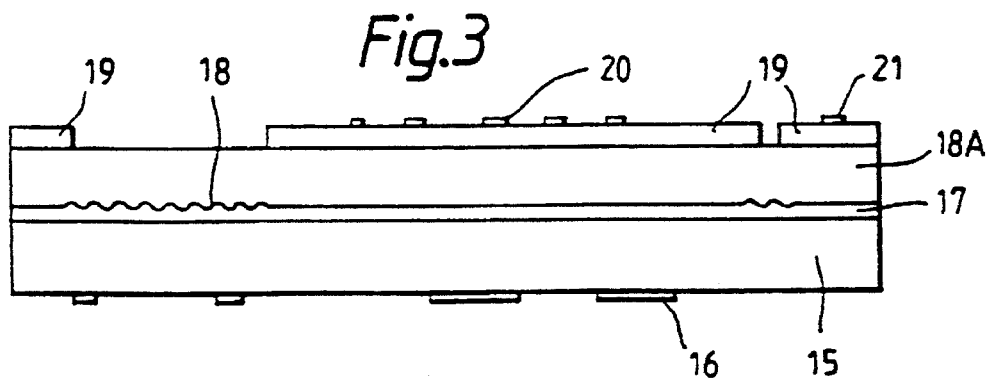
FIG. 3 is a cross-section on the line 3—3 in FIG. 2.

This card is illustrated in section along lines 3—3 in FIG. 3. A polymeric layer 15 is of opaque or transparent plastic such as PVC on the reverse of which there are applied security markings 16. A metallic coating 17 has been laminated to the layer 15. The holographic embossing area is shown as 18 formed in transparent plastic film 18A. On the upper surface of the layer 18A an indicia receptive coating 19 of screen printed ink is provided which carries security indicia 20 and individualising printing 21.

Figure 4:
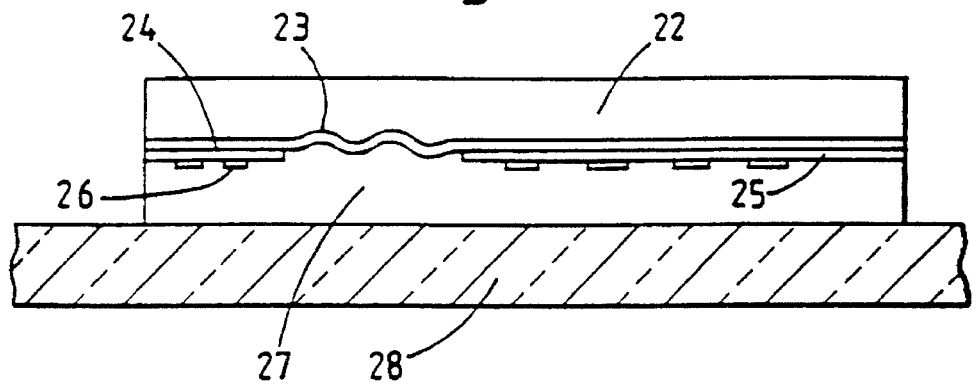
FIG. 4 is a cross-section through a tax certificate mounted to a windscreen.

Vehicle tax certificates may be prepared as in FIG. 4. Here embossable plastic film 22 such as polypropylene is embossed locally with an holographic pattern 23. The complete surface of the film 22 is corona treated to provide an intermediate level of bond strength (which would fail if peeling of the affixed article were attempted) and then is metallised thinly but opaquely to form layer 24. An opaque indicia receptive coating 25 of printing ink is applied for example by screen printing on a rotary press to cover all but the viewable holographic area. Onto this coating are then applied printed indicia 26 designating the type of document. This further printing 26 may be delivered against a background of fine security printing (not shown) applied to layer 25. The tax disc may also contain individualising details containing for example details of the vehicle, applied say by laser xerography. An adhesive layer 27 may be applied at the time of manufacture of the tax certificate if no personalising particulars have to be applied. The adhesive will generally be a pressure sensitive adhesive such as a partially crosslinked polyacrylate transfer adhesive and it will be protected by a removable release layer.

If personalising particulars have to be applied then the adhesive is not applied until after personalising. In that instance the adhesive may be a transfer adhesive coating. The tax certificate is then adhered to the windscreen glass 28. The tax disc may be individualised by punching out holes say to indicate a day and a month from a specific series of such indicia.

As a further alternative the complete film 22 may be embossed with a generic pattern, or with a generic pattern covering all except the principle holographic area which is simultaneously embossed with a different generic or discrete holographic image. From the reverse the tax disc will be seen to have an overall holographic appearance.

Tax certificates may be supplied in bulk to the issuer in continuous stationery format to allow the computerised printing of individual discs.

Figure 5:
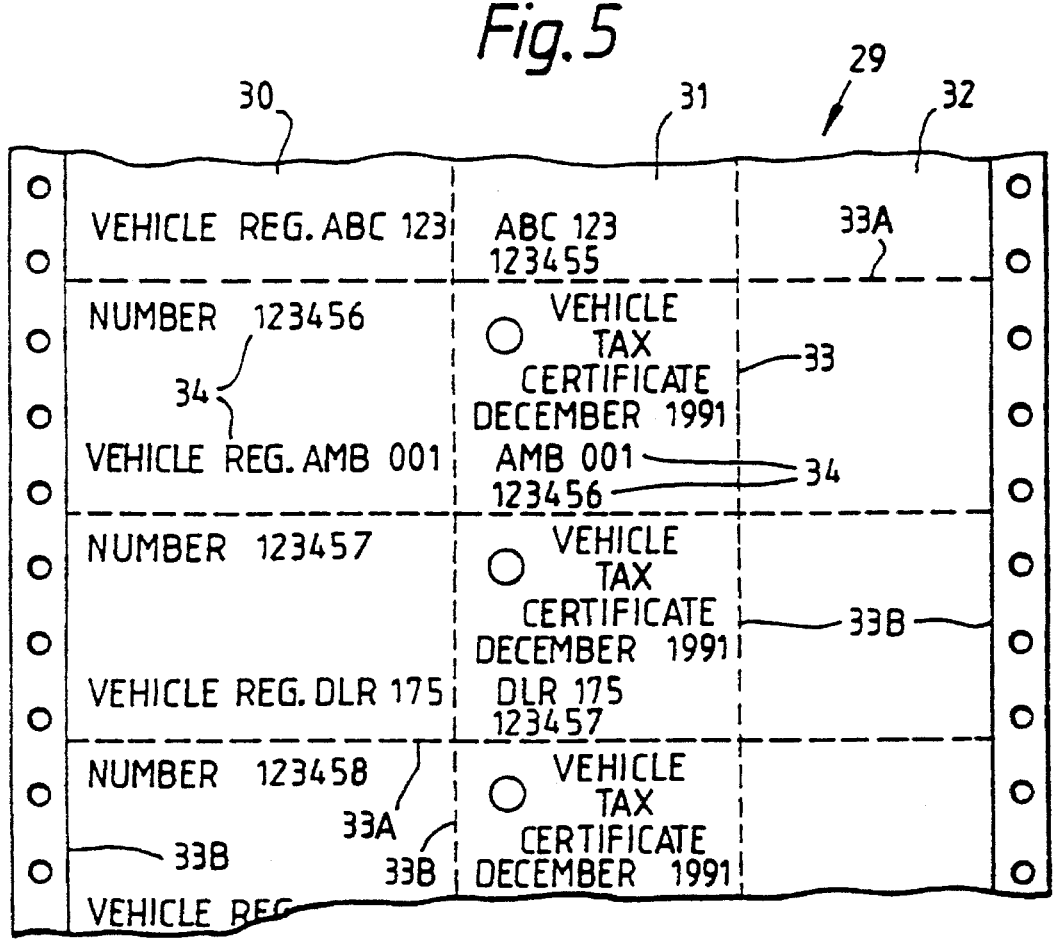
FIG. 5 illustrates part of a multiple article carrying sheet.

An example of such a computerised stationery format 29 is given in FIG. 5. Here multiple tax certificates are delivered on edge punched sheets. Area 30 provides the office of issue with a reference. Area 31 comprises the tax certificates to be printed and area 32 a self adhesive transfer film. The article of the invention may be affixed to zone 31 for example if the web comprises paper, or the plastic film holding the hologram may extend across the web. The stationery is horizontally and vertically perforated 33A, 33B.

The registration number of the vehicle and the serial number 34 of the certificate are printed by laser printing methods onto the reference and tax certificate areas 30, 31. After imaging the vehicle tax certificate 31 and the adjacent adhesive film 32 are detached from the reference area. The release paper on the upper surface of the adhesive film 32 is removed and the adhesive film folded so that it completely adheres to the face of the tax certificate 31. It is then sent to the vehicle owner.

A release layer covering the other side of the adhesive film 32 is then removed allowing the tax certificate 31 to be adhered to the window of the vehicle. Adhesive transfer films in which the two sides of the adhesive have different release properties are well known.

If tampering occurs the embossed plastic film is likely to delaminate irreversibly and may distort in the process. Polypropylene may be used as the plastic for embossing and bonding between it and the metallic coating may be induced by treating the polypropylene with a corona discharge before metallising. By causing the hologram to fail in this manner, fraudulent use is prevented.

As an alternative to xerographic imaging, date information may be imparted by punching holes through the desired numbers. This can be done through the adhesive film 32.

Figure 6:
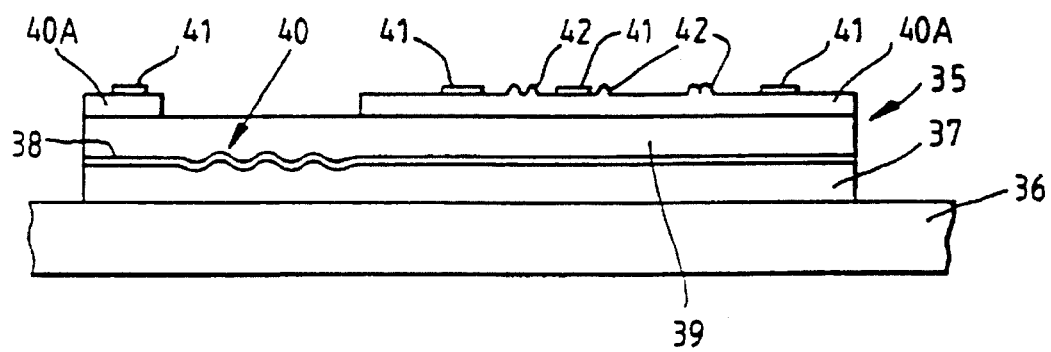
FIG. 6 is a cross-section through a visa.

FIG. 6 illustrates a visa 35 affixed to the page of a passport 36 by adhesive 37. The metallic coating 38 covering an optionally corona treated, locally embossed plastic film 39 such as polypropylene creates the viewable holographic effect in area 40. The non-holographic areas are coated with an opaque indicia receptive coating, 40A. This coating is used to support security indicia 41. Prior to applying any adhesive the printed holographic article is passed through an intaglio press so as to impart a surface texture 42 to the visa. If necessary the visa can be personalised before issue by providing optically readable characters, bar codes and the like by computer controlled printing. Trying to remove the visa from the passport will lead to delamination, typically between the metallic coating 38 and the plastic film 39 which is an irreversible failure. The level of adhesion at this interface may be controlled by corona treatment of the film 39 before metallising with layer 38 (or application of a respective-transparent coating such as zinc sulphide).

In alternative embodiments the principle of the invention may be incorporated into a bank note thread in which part of the thread is viewable by the holder of the item. Here miniature holographic areas would be subtly overprinted with indicia receptive coating presented with or containing (as windows) defining fine security indicia. Both sides of the thread may be embossed, metallised and printed. The embossed areas may be provided with clear protective lacquer.

Identity cards may be made by providing a structure similar to that shown in FIG. 1 but which has a folding line. This would allow personalising details to be applied printed in one pass. After printing the article would be folded and either inserted in a sealed plastic pouch, or the backs may be adhered together to provide an integral structure, which may be itself be bonded into a pouch.

EXAMPLE

Vehicle tax certificate.

A roll of polypropylene film of thickness approximately 50 microns and approximately one metre wide is embossed completely with a generic holographic pattern by passing the film though an embossing station at which under heat and pressure a substantially continuous holographic pattern is replicated from a nickel shim.

The embossed surface of the polypropylene is then corona discharge treated with an energy of approximately 36–38 dynes per centimetre by passing film from the roll under the corona to provide a level of bonding which will fail if peeling is later attempted.

The roll of corona treated embossed polypropylene is then placed in a vacuum metalliser and a thin opaque layer of aluminium of approximate thickness 15 nm–30 nm is applied to the corona treated surface by running the film past a vapour deposition station.

The metallised roll is then transferred to a rotary screen printing press and an opaque white screen printing ink is applied as an indicia receptive coating.

The coating provides a background but the viewable holographic area is left unprinted. Characters are also printed by preventing screen printing ink from covering character shapes.

After coating the roll has multiple reproductions of the incomplete article. The roll is then printed lithographically with security indicia in different colour inks on top of the indicia receptive coating and optionally the viewable holographic area.

The roll may then be laminated with a transfer pressure sensitive adhesive provided on a releasable carrier which may be transparent. Adhesive is applied to the printed metallised surface. The laminate may then be cut in register into individual articles.

The tax certificate may be adhered to the windscreen by removing the release layer and smoothing the surface against the windscreen. Should an attempt to remove this be made the polypropylene will delaminate from the metal destroying the holographic effect irreversibly. The metal-ink-adhesive cannot be removed intact. A further benefit of this construction is that the polypropylene is relatively soft and is liable to distortion on peeling. A further considerable advantage of this construction is that the metal is liable to block out direct sunlight before it reaches the polypropylene thereby enhancing the life of the article.

In order to individualise the tax certificates the laminate may be punched in register with printed characters on it to define say the expiry date.

If particulars of the vehicle have to be added by the issuing authority, tax certificates lacking the adhesive may be supplied in continuous manner as described previously.

Figure 7:
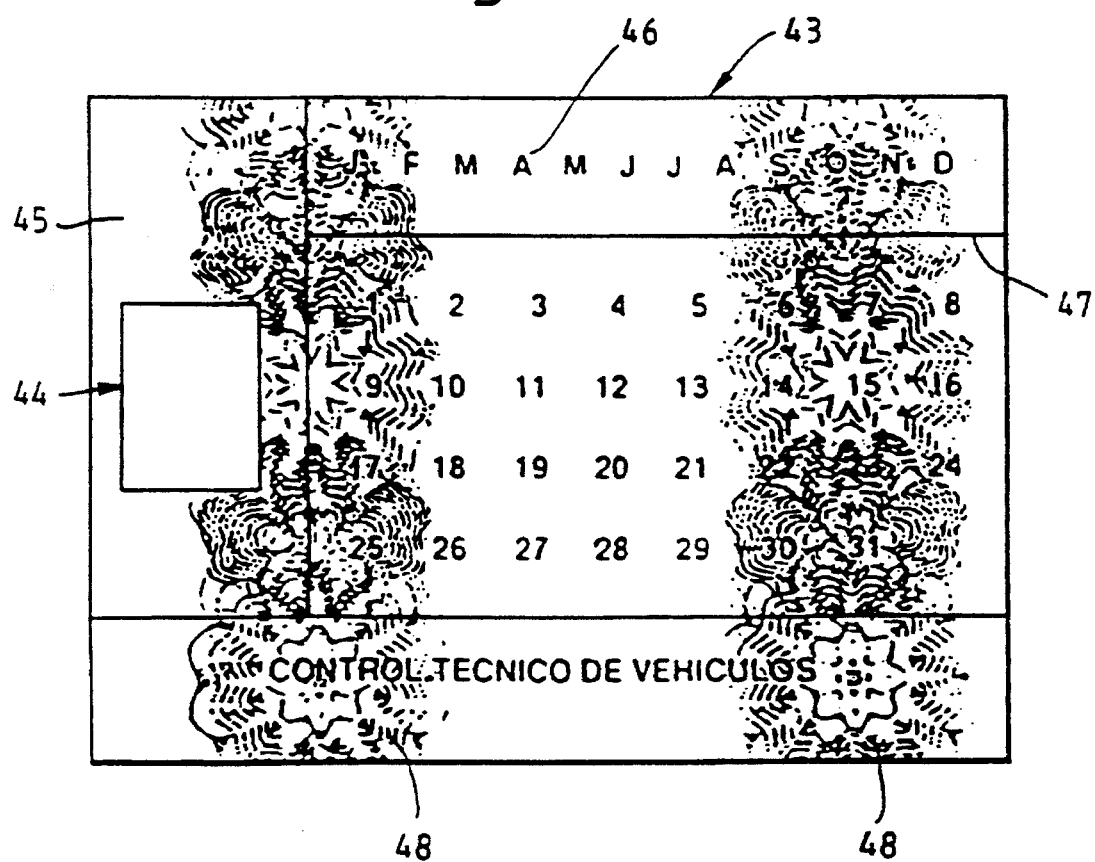
FIG. 7 is a plan view of a vehicle tax certificate.

In accordance with the Example, FIG. 7 illustrates a tax certificate 43 as would be viewed through a windscreen and its transparent affixing adhesive. The viewable holographic area 44 exhibits a generic holographic effect which also underlines the indicia receptive coating and extends to the edges of the plastic film ie.the whole surface has been embossed. Indicia receptive coating 45 obscures all of the remainder of the article except windowed text areas 46 and narrow line work 47 through which the holographic effect is viewable. The viewable text and lines exhibit holographic effects. A security pattern 48 has been printed on top of the background printed article. This printing is also continuous over the holographic areas. The reverse side of the article (not shown) exhibits an overall generic hologram effect extending over the complete surface, including those areas underlying the printing.

Anti tamper labels according to the present invention may be employed for sealing and/or authenticating containers such as video cassettes and computer software discs.

In an article which is to be viewed from one side only there are a number of variations possible for the optically variable effect, indicia receptive coating and printing. The optically variable effect may be visible as a rectangular or other geometric shaped area, through multiple windows, as negative characters, bars or a thread. These are achieved by printing the indicia receptive coating onto the substrate in an appropriate manner e.g. by masking to form windows.

The indicia receptive coating may be a monochrome (black or white) coating, a single colour or a rainbow effect. Either it defines a negative character leaving that shaped holographic area visible or an opaque area can be overprinted such as with inks on a press for security indicia or other comp. printing e.g. xerox, laser printing thermal transfer ink jet or ion deposition.

FIG. 8 illustrates a number of examples of embossed substrates overprinted with indicia receptive coatings. The coating 51 in FIG. 8a is printed such that an underlying optically variable effect generating structure, e.g. to generate a hologram, is visible as an individual geometric area 52. The coating 51 is overprinted with security indicia shown schematically by lines 53. In FIG. 8b a band 54 is provided in addition to the geometric area 52 through each of which the underlying hologram is visible. The band 54 may be formed by leaving that part of the polymeric film transparent. It may be left as a transparent band or may be coated with specular inks or embossed and metallised to produce a different holographic effect.

Figure 8A:
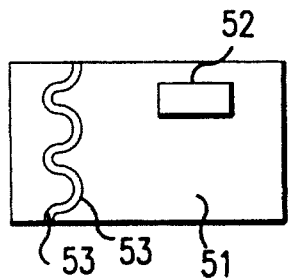
FIGS. 8 and 9 illustrate a number of layouts possible on an article according to the invention.
Figure 8B:
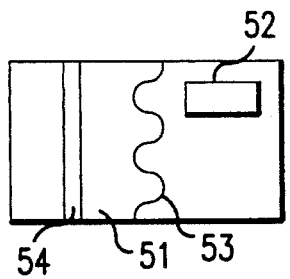
Figure 8C:
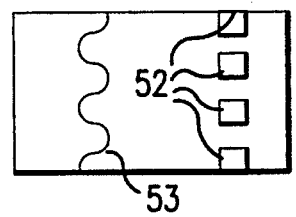
Figure 8D:
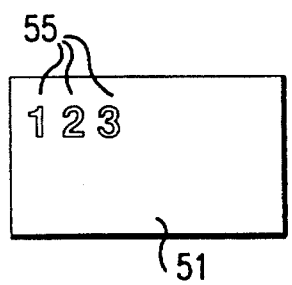
Figure 8E:
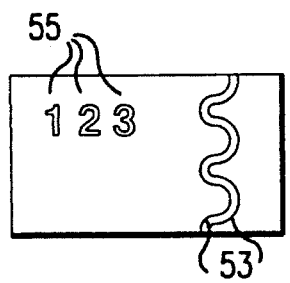

FIG. 8c has a number of geometric areas 52 in which holographic effects are visible together with security indicia 53. These areas 52 may exhibit holographic effects which appear in different colours. FIGS. 8d and 8e show an article which has been embossed to produce an holographic effect and then over printed with indicia receptive coating 51 except for character shaped areas or windows 55 so that the visible part of the optically holographic effect is in the form of numbers or characters. Printed security indicia 53 are also provided on the article (FIG. 8e).

Figure 8F:
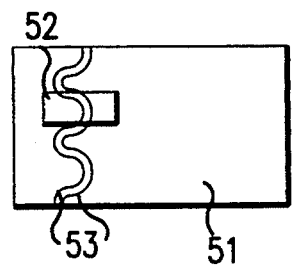
Figure 8G:
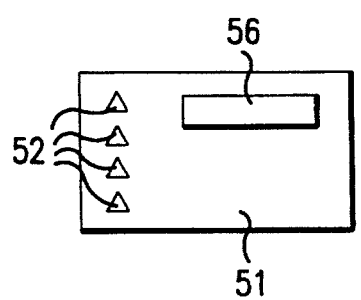
Figure 8H:
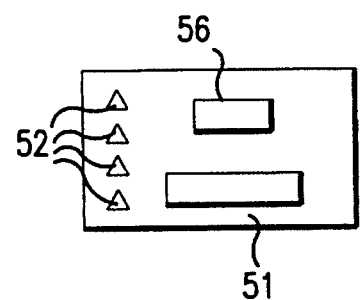

FIG. 8f illustrates an article which is overprinted with an indicia receptive coating 51 except for a holographic area 52. Printed security indicia 53 are provided over the coating 51 and window 52. FIGS. 8g and 8h show articles which have multiple geometric areas 52 at which holographic effects are visible and other defined areas such as a signature strip layer 56 which can be provided with an ink receptive coating to receive the user's signature.

Figure 9:
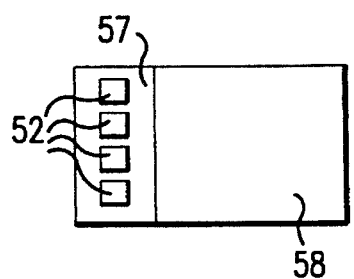

FIG. 9 shows an article provided with four individual holographic areas 52 which may provide an easily recognisable combination for authentication e.g. red, orange, green and blue colours in that order. The immediately surrounding area 57 has a generic holographic effect and the remainder of the article 58 has a metallic coating.

Figure 10:
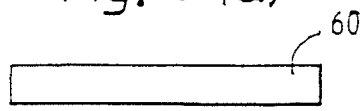
FIG. 10 illustrates construction of articles according to the invention.
Figure 10:
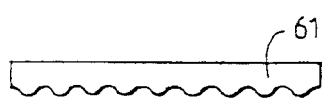
Figure 10:
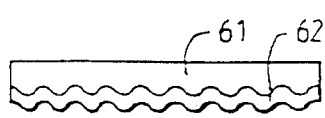
Figure 10:
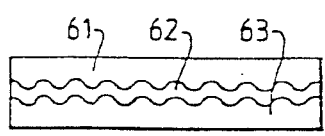
Figure 10:
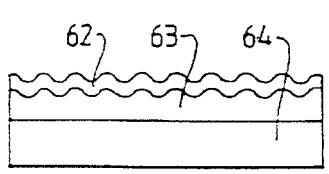
Figure 10:
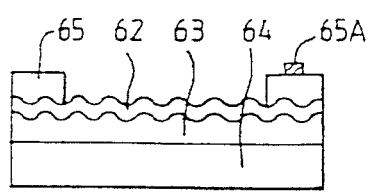
Figure 10:
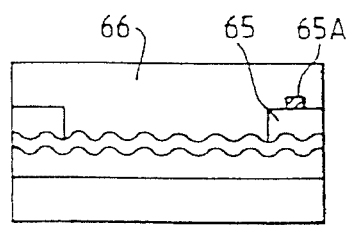
Figure 10:
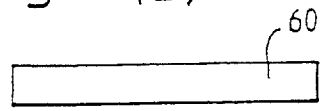
Figure 10:
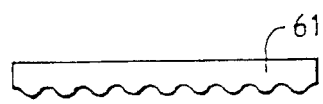
Figure 10:
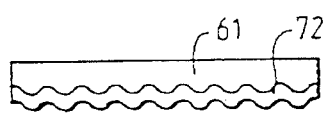
Figure 10:
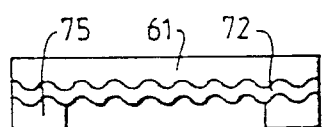
Figure 10:
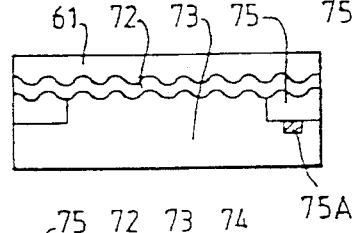
Figure 10:
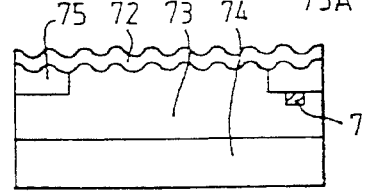
Figure 10:
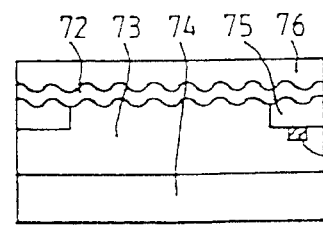
Figure 10:
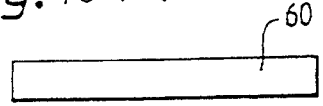
Figure 10:
Figure 10:
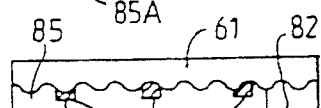
Figure 10:
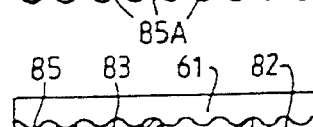
Figure 10:
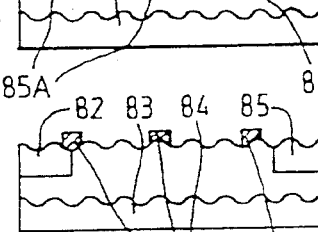
Figure 10:
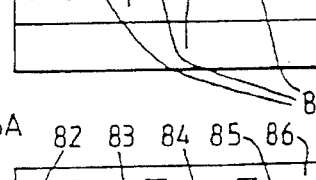
Figure 10:
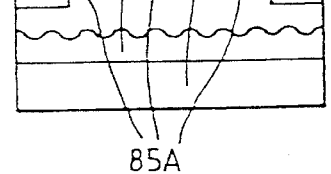

FIGS. 10(a), (b) and (c) illustrate the steps involved in manufacturing an article in various ways. In FIG. 10(a) a polypropylene carrier 60 is embossed to form embossed carrier 61 and may optionally be corona treated. The embossed treated carrier is then provided with a metal coating 62 over the embossed surface and an adhesive layer 63 to cover this metal coating. The article is adhered to a substrate 64 by the adhesive 63 and the carrier 61 is separated from the metallic layer 62 and removed. An indicia receptive coating 65 which may contain character shaped windows not shown is then printed over part of the metallic layer 62. Optionally security printing 65A may be applied to the indicia receptive layer 65 followed by an optional protective lacquer 66 to cover the surface of the article remote from the substrate.

In an alternative method shown in FIG. 10(b) an indicia receptive coating 75 is applied to a metallic layer 72 which has been applied to the carrier 61. The coating either contains indicia shaped windows not shown or is printed with inked indicia 75A. This is followed by application of an adhesive layer 73 which is transparent. The article is then transferred onto a transparent substrate 74 and the carrier 61 removed. An optional lacquer 76 may be applied over the metallic layer 72.

In a third variation, shown in FIG. 10(c), the embossed surface of the carrier 61 is printed 85A an indicia receptive coating 85 is applied directly to the carrier 61 and ink 85A. A metallic layer 82 is then applied followed by an adhesive layer 83 and the article is transferred to a substrate 84. If carrier 61 is removable a lacquer 86 may be applied over the indicia receptive coating 85 and metallic layer 82.

The carrier may be provided with a lacquer layer before embossing. The method then proceeds through similar steps to those described in the above examples except that removal of the carrier leaves the lacquer already in place over the printed and metallised substrate rather than adding it as a final step.

A plastic film may be embossed, printed and metallised and then provided with either a lacquer or adhesive layer. The adhesive layer is covered by a release paper so that the article may be applied to the substrate as desired whilst the lacquer produces an individual finished article.

We claim:

1. An article comprising a substrate having a structure for generating a viewable optically variable effect, the substrate being partially printed with a continuous non-self-supporting, indicia-receptive coating, wherein the coating acts as a mask which overlies at least part of the structure for generating the viewable optically variable effect and includes at least one window through which the viewable optically variable effect can be observed.

2. An article according to claim 1, wherein indicia are provided on the surface of the substrate not carrying the continuous coating.

3. An article according to claim 1, wherein the at least one window defines indicia.

4. An article according to claim 3, wherein the indicia comprises alphanumeric characters.

5. A method of manufacturing security articles, the method comprising:
   providing a substrate having a structure for generating an optically variable effect; and
   printing a partial, continuous, non-self-supporting, indicia-receptive coating on the substrate;
   wherein the coating acts as a mask which overlies at least part of the structure for generating the optically variable effect and includes at least one window through which the optically variable effect can be observed.

6. An article according to claim 1, wherein the article consists of the substrate and printing alone.

7. An article according to claim 1, wherein the substrate consists of a polymeric film alone.

8. An article according to claim 1, wherein the coating defines a rainbow effect.

9. An article according to claim 1, wherein the substrate comprises a polymeric film.

10. An article according to claim 9, wherein the polymeric film extends throughout the article.

11. An article according to claim 1, wherein the at least one window in which the optically variable effect is visible exhibits one of an individual, discrete optically variable effect image and a repetitive pattern.

12. An article according to claim 1, wherein the coating covers a substantial area of the substrate.

13. An article according to claim 1, wherein a metallic coating is provided on the substrate, the metallic coating being selectively removed to define security indicia.

14. An article according to claim 1, further including an outermost adhesive layer to enable the article to be adhered to a surface.

15. An article according to claim 1, wherein the optically variable effect is one of a diffraction polarization and interference effect.

16. A security article according to claim 1, wherein the article is selected from the group comprising passports, visas, vehicle licence certificates, vehicle tax certificates, identity cards, financial transaction cards, access cards, cheques, bond, tickets, passes, brand protection items, authentication certificates, vouchers, bank notes, bank note threads, credit notes, financial instruments, legal documents, stamps, permits, licences such as driving licences, lottery tickets and gaming cards, machine readable holographic articles and the like.

17. An article according to claim 1, wherein printing is provided on the coating.

18. An article according to claim 1, wherein at least one of the printing and the at least one window define security indicia.

19. A method according to claim 5, further comprising; defining a number of portions on the substrate each incorporating a first viewable optically variable effect area and a separate second indicia providing viewable area, wherein the separate area of the substrate exhibits printing and divides the substrate into individual portions.

20. A method according to claim 19, wherein printing is applied before dividing the substrate into individual portions.

21. A method according to claim 5, wherein the film comprises a polymeric film.

22. A method according to claim 5, wherein the coating is opaque.

23. A method according to claim 5, wherein the substrate is in the form of a roll.

24. A method according to claim 5, wherein the coating defines a rainbow effect.

25. A method according to claim 5, wherein the optically variable effect generating structure includes partial metallisation.

26. A method according to claim 25, further comprising; applying a corona treatment to the surface of the substrate which will carry the metallisation.

27. A method according to claim 26, wherein the metallisation is in the form of a half tone dot pattern.

28. A method according to claim 5, further comprising; providing indicia on the indicia receptive coating.

29. A method according to claim 5, wherein at least one of the printing and the indicia define security indicia.

* * * * *